United States Patent
Merola

[11] 3,735,463
[45] May 29, 1973

[54] METHOD OF FORMING TAPERED TUBULAR MEMBERS

[75] Inventor: Anthony Merola, Pittsburgh, Pa.

[73] Assignee: Amerola Products Corporation, Pittsburgh, Pa.

[22] Filed: Nov. 4, 1971

[21] Appl. No.: 195,794

[52] U.S. Cl..............29/155 C, 29/414, 29/DIG. 11, 29/DIG. 41, 29/DIG. 42
[51] Int. Cl. ...........................................B23p 17/00
[58] Field of Search ....................29/155 C, 155 R, 29/414, DIG. 11, DIG. 41, DIG. 42

[56] References Cited

UNITED STATES PATENTS 2,181,927  12/1939  Townsend ......................29/DIG. 41
3,540,112  11/1970  Knox...................................29/414

Primary Examiner—Thomas H. Eager
Attorney—Walter G. Sutcliff

[57] ABSTRACT

A method of forming tapered, generally tubular members having a controlled wall thickness along the length of the tapered member, comprising elongating a portion of a hollow, cylindrical body to decrease the wall thickness of the elongated portion of the body, and thereafter tapering a selected portion of the body to a predetermined shape by reducing the diameter of the selected portion.

12 Claims, 3 Drawing Figures 3,735,463

METHOD OF FORMING TAPERED TUBULAR MEMBERS

BACKGROUND OF THE INVENTION

Tubular members, and particularly metallic tubular members, are generally tapered to a variety of useful shapes by conventional swaging operation. The uniform wall thickness tubular member is swaged to reduce the diameter of the member at selected portions with the consequent result that the wall thickness increases at the reduced diameter portion. Tapered tubular members can be used for such diverse application as ball bats, furniture legs and pool cues. It is sometimes desirable to restrict or limit the wall thickness at the reduced diameter swaged portion of a tapered tubular member. It has been the practice in so restricting the wall thickness to effect the swaging over a internally disposed mandrel. In other applications, particularly in swaged formed metal ball bats, a costly boring out of the wall portion of the handle has been utilized.

SUMMARY OF THE INVENTION

A method of forming a tapered, generally tubular member having a controlled wall thickness along the length of the member comprising elongating a portion of a hollow, cylindrical body starting piece to decrease the wall thickness along the elongated portion of its length, and thereafter tapering the elongated, hollow, cylindrical body to a predetermined shape. The wall thickness of the final product can be thus accurately controlled at any point along its length by controlling the degree of elongation and reduction of wall thickness during the initial processing step.

In the preferred embodiment, a generally uniform wall thickness hollow, cylindrical body is utilized as starting material, and this body is elongated by engaging same at least at two spaced portions along its length, and thereafter applying a predetermined force to the body at the engagement position wherein a substantial component of the force is directed parallel to the longitudinal axis of the body, whereby a portion of the body elongates between the engaged positions, with the wall thickness of the elongated portion being reduced a predetermined amount.

DESCRIPTION OF THE PREFERRED EMBODIMENT

Figure 1:
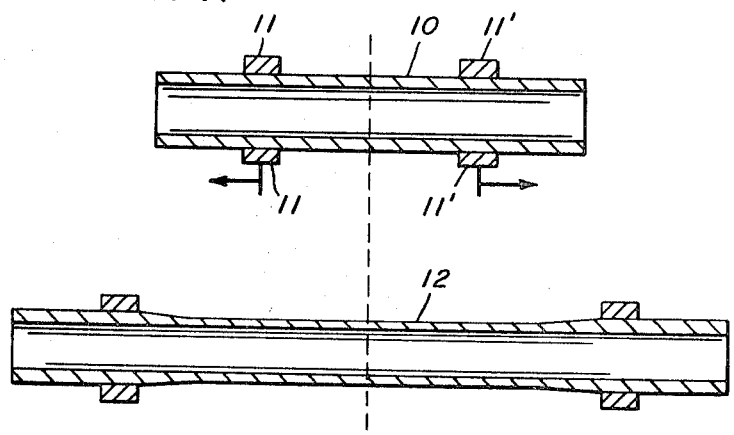
FIG. 1 is a schematic representation of the practice of the present invention wherein the tubular member which is acted upon is showed before and after elongation.

The invention can be best understood by reference to an exemplary embodiment which is in turn understood by reference to the accompanying drawings. In FIG. 1, a hollow, cylindrical body 10 which has a substantially uniform wall thickness along its length, is shown engaged by spaced collet means 11 and 11', which preferably effect a circumferential frictional engaging fit about the body 10 at spaced predetermined positions along its length.

The body 10 is formed of a material such as aluminum tubing, which can be elongated by application of a longitudinally directed force. The collet means 11 and 11' are connected to conventional hydraulic means, not shown, whereby a substantial elongating force is applied to the tubular member, wherein a substantial component of the force is directed parallel to the longitudinal axis of the tubular member. In the embodiment shown in FIG. 1, the collet means 11 at the left hand side of the drawing apply a force in the direction shown by the arrow to the left, and the collet means 11' on the right hand side of the drawing are used to transmit an opposite force in the direction of the arrow in a rightward direction. The body 10 elongates as depicted in FIG. 1 whereby the wall thickness of the elongated portion 12 is reduced a predetermined amount.

Figure 3:
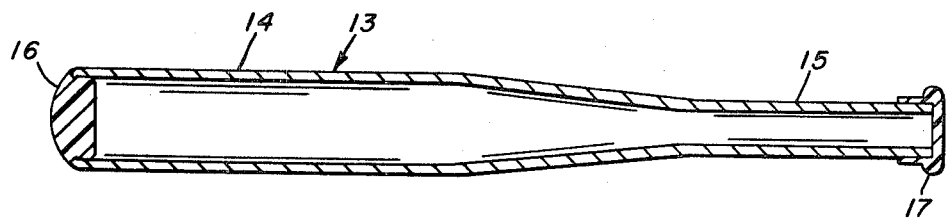
FIG. 3 is an elevational view in section of a ball bat prepared by the process of the present invention.

The elongated tubular member can be cut at its midpoint along the dotted line shown in FIG. 1 and each resultant workpiece tapered to form a final product. The final product can be, for example, a ball bat 13 as depicted in FIG. 3. One half of the severed elongated tubular body 10 is formed by a swaging operation primarily directed upon the elongated thin wall portion 12 of the workpiece. The ball bat 13 generally comprises a striking end portion 14 and a tapered reduced diameter handle portion 15 at the other end thereof. A rubberous sound deadening means 16 is provided as a closure at the end of the striking end 14, and rubberous knob 17 is force fitted over the handle end portion 15.

The original nonelongated portion of the body 10 becomes the striking end 14 of the ball bat while the elongated portion 12 generally is formed into the handle portion 15 of the ball bat.

In another embodiment showing the practice of the present invention in FIG. 2, again substantially uniform wall thickness tubular member 10 is engaged by spaced collet means 11 and 11' with collet means 11 fixedly holding the tubular member in place and hydraulic means, not shown, are connected to collet means 11' to provide a predetermined elongating force to the body 10, with a substantial component of force directed parallel to the longitudinal axis of tubular member as generally shown by the arrows in FIG. 2. The tubular member 10 is thereby elongated with the wall thickness of the elongated portion being reduced a predetermined amount. In this embodiment a mandrel 18 is interiorly disposed within the hollow body 10 to insure maintenance of the original inside diameter of the body 10 during the elongation process.

The method of the present invention has wide application in fabricating any number of tapered, tubular members. The method is particularly useful as already mentioned in producing aluminum ball bats such as shown in U.S. Pat. No. 3,479,030, which have recently gained widespread acceptance in the sporting goods field. A plurality of tubular amuminum members with a wall thickness ranging from about 0.07 to 0.12 inch in thickness can be readily elongated at one time by engaging the members at points spread about 10 inches from opposite ends of the members, which by way of example are from about 50 to 60 inches in length. The tubular members are elongated in length by about ten percent with a proportionate reduction in wall thickness for the elongated portion. As already mentioned, the elongated workpiece is cut at its midpoint to provide two pieces which can be formed into ball bats. The tapering and forming of each half of the original workpiece is effected by a conventional swaging operation wherein a selected portion of the workpiece has its diameter dereased with a consequent increase in wall thickness.

The present method permits optimum utilization of aluminum in forming such aluminum ball bats. The elongation before swaging means that the resultant wall thickness of the swaged portion will be decreased from the wall thickness which would have resulted if a uniform wall thickness tubular member had been used as a starting workpiece. The same result can be produced by swaging a uniform wall thickness starting tube over an interiorly disposed mandrel, but this operation has several objections, primarily it requires a slow, careful swaging since the mandrel must be centralized. The mandrel is subject to wear and breakage, and can easily become lodged within the piece.

The present method avoids all these difficulties and permits rapid production of the ball bats. This is principally because a plurality of tubular members can be easily elongated at a time. The elongated members can be then more easily swagformed into the final ball bat product.

It should be apparent that while the invention has been described with respect to the elongation and forming of tubular aluminum, that the method has application to other materials including other metals with similar working characteristics, as well as plastic materials which have comparable working characteristics.

Figure 2:
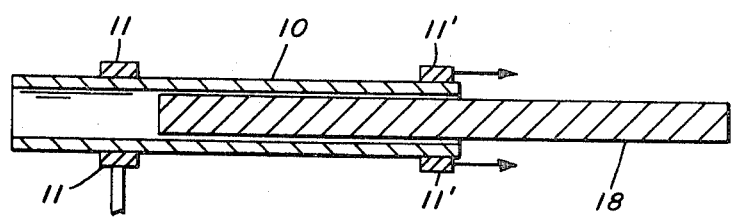
FIG. 2 is a schematic representation of the practice of the present invention wherein a mandrel is interiorly disposed within a portion of a tubular member.

The use of an interiorly disposed mandrel has been shown in FIG. 2, in order to insure maintenance of the inside diameter of the tube during elongation. The mandrel performs another function in that it prevents deformation of the tube by the collet means since it reinforces the tube under the area covered by the collet means. Thus, a pair of such interiorly disposed mandrels can be employed in FIG. 1 beneath the collet means 11 and 11'. If the interiorly disposed mandrel is attached to the hydraulic means which are also connected to the respective collet means the elongating force is then applied to the tube both on the outer and inner surface of the tube. The ends of such mandrels should be chamfered to prevent weakening of the tube.

It is apparent that after the starting tube is elongated to provide the desired wall thickness profile along the length of the starting tube, the elongated portion or the non-elongated portion may be tapered to produce a desired tapered end product. The tapering of the tube can be accomplished by forming technique other than by swaging.

I claim:

1. Method of forming a tapered tubular member having a predetermined wall thickness profile along the length thereof, from a hollow cylindrical body having a generally uniform wall thickness comprising:
   a. elongating a portion of the hollow cylindrical body to decrease the wall thickness of the body along said portion; and
   b. tapering a portion of said elongated hollow cylindrical body to a predetermined configuration to produce a tapered tubular member having a predetermined wall thickness profile along the length thereof.

2. The method specified in claim 1, wherein the elongated portion of the hollow cylindrical body is tapered by reducing the diameter of the elongated portion.

3. The method specified in claim 1, wherein the hollow, generally cylindrical body is elongated by;
   i. engaging the hollow, generally cylindrical body at least at two spaced positions along its length; and
   ii. applying predetermined force to the hollow, generally cylindrical body at least at one engagement position wherein a substantial component of the force applied is directed parallel to the longitudinal axis of the tubular member whereby the tubular member elongates between the engaged positions with the wall thickness of the elongated portion being reduced a predetermined amount.

4. The method specified in claim 3, wherein the tapering is effected by swaging a portion of the tubular member.

5. The method specified in claim 3, wherein the engagement of the tubular member is effected by a circumferential frictional engagement.

6. The method specified in claim 3, wherein the elongating force is applied at one engagement position with the other engagement position being fixed whereby the elongation takes place in one direction.

7. The method specified in claim 3, wherein the elongating force is applied in opposite directions at both engagement positions whereby the elongation takes place in two opposite directions.

8. The method specified in claim 3, wherein the elongation is carried out with a mandrel disposed within the tubular member to insure maintenance of the internal diameter of the tubular member.

9. The method specified in claim 3, wherein the tubular member is tapered into a ball bat shape and end closure means are inserted in the ends of the tubular member to complete the ball bat.

10. Method of forming a tapered, generally tubular ball bat having a controlled predetermined wall thickness along the length thereof from a hollow, generally cylindrical body having a generally uniform wall thickness, which method comprises:
    a. elongating a portion of the hollow, generally cylindrical body to decrease the wall thickness of the said body along said elongated portion ; and
    b. tapering said elongated, hollow cylindrical body to the desired ball bat shape by reducing the diameter of a selected portion of the said body.

11. The method specified in claim 10, wherein the hollow, generally cylindrical body is elongated by;
    i. engaging the hollow, generally cylindrical body at least at two spaced positions along its length; and
    ii. applying predetermined force to the hollow, generally cylindrical body at least at one engagement position wherein a substantial component of the force applied is directed parallel to the longitudinal axis of the tubular member whereby the tubular member elongates between the engaged positions with the wall thickness of the elongated portion being reduced a predetermined amount.

12. The method specified in claim 11, wherein the elongated body is cut at its midpoint and the resultant two partially elongated pieces tapered by swaging to the desired ball bat shape.

* * * * *